US012645915B2

(12) United States Patent
Luus et al.

(10) Patent No.: US 12,645,915 B2
(45) Date of Patent: Jun. 2, 2026

(54) LOGIC EMBEDDINGS FOR COMPLEX QUERY ANSWERING

(71) Applicant: International Business Machines Corporation, Armonk, NY (US)

(72) Inventors: Francois Pierre Luus, Wierdapark (ZA); Prithviraj Sen, San Jose, CA (US); Ryan Nelson Riegel, Carrollton, GA (US); Ndivhuwo Makondo, Pretoria (ZA); Thabang Doreen Lebese, Johannesburg (ZA); Naweed Aghmad Khan, Johannesburg (ZA); Pavan Kapanipathi Bangalore, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 17/488,226

(22) Filed: Sep. 28, 2021

(65) Prior Publication Data

US 2023/0100883 A1     Mar. 30, 2023

(51) Int. Cl.
| | |
|---|---|
| *G06N 20/00* | (2019.01) |
| *G06F 16/2455* | (2019.01) |
| *G06N 3/042* | (2023.01) |
| *G06N 3/08* | (2023.01) |

(52) U.S. Cl.
CPC ......... *G06N 3/042* (2023.01); *G06F 16/2455* (2019.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2013/0006641 A1 | 1/2013 | Brown | |
| 2013/0091086 A1* | 4/2013 | Hively | G06N 20/00 |
| | | | 706/50 |
| 2018/0341720 A1* | 11/2018 | Bhatia | G06F 17/10 |
| 2020/0242444 A1* | 7/2020 | Zhang | G06N 3/042 |

FOREIGN PATENT DOCUMENTS

| | | | | |
|---|---|---|---|---|
| CN | 111581365 A | * | 8/2020 | G06F 16/3329 |
| CN | 111666770 A | * | 9/2020 | G06F 16/3346 |
| CN | 108647233 B | * | 11/2020 | |

OTHER PUBLICATIONS

Kotnis B, Lawrence C, Niepert M. Answering complex queries in knowledge graphs with bidirectional sequence encoders. CoRR, abs/2004.02596. Apr. 6, 2020. pp. 1-9.
Ren H, Leskovec J. Beta embeddings for multi-hop logical reasoning in knowledge graphs. arXiv preprint arXiv:2010.11465. Oct. 22, 2020. pp. 1-14.

(Continued)

*Primary Examiner* — Xuyang Xia
(74) *Attorney, Agent, or Firm* — CHIP LAW GROUP

(57) ABSTRACT

To improve the technological process of computerized answering of logical queries over incomplete knowledge bases, obtain a first order logic query; with a trained, computerized neural network, convert the first order logic query into a logic embedding; and answer the first order logic query using the logic embedding.

26 Claims, 11 Drawing Sheets

Which films start SilverSphere winners that have not also won an Arthur?

$q(T) = \exists V$ Winner($V$, SilverSphere) $\wedge$ ¬Winner($V$, Arthur) $\wedge$ Starring($T$, $V$) = $\exists V$ $w(V, g) \wedge ¬w(V, o) \wedge s(T, V) = 1 - D(T, A)$    answer subset $A$

Maximal Skolem function
Reasons with subsets, substitutes with largest related subset. Transitions FOL to Skolem set logic.

301

Logical negation
Involute logical negation of latent propositions that characterize subsets - a direct approach.

303

Real-valued logic
Weighted t-norm with attention performs set intersection logically on truth bounds.

305

Fast querying
Locality-sensitive hashing to find neighbors, also evaluates logical satisfiability directly.

307

(56) References Cited

OTHER PUBLICATIONS

Abboud R, Ceylan II, Lukasiewicz T, Salvatori T. Boxe: A box embedding model for knowledge base completion. arXiv preprint arXiv:2007.06267. Jul. 13, 2020. pp. 1-27.

Arakelyan E, Daza D, Minervini P, Cochez M. Complex query answering with neural link predictors. arXiv preprint arXiv:2011. 03459. Nov. 6, 2020. pp. 1-14.

Wang WY, Cohen WW. Learning First-Order Logic Embeddings via Matrix Factorization. Inljcai Jul. 9, 2016 (pp. 2132-2138). pp. 1-7.

Garg D, Ikbal S, Srivastava SK, Vishwakarma H, Karanam H, Subramaniam LV. Quantum embedding of knowledge for reasoning. Advances in Neural Information Processing Systems. 2019;32:5594-604. pp. 1-11.

Francois Pierre Luus, Prithviraj Sen, Pavan Kapanipathi, Ryan Nelson Riegel, Ndivhuwo Makondo, Thabang Doreen Lebese, and Alexander Gray, Logic Embeddings for Complex Query Answering, arXiv preprint arXiv:2103.00418v1. Feb. 28, 2021. Grace Period Disclosure.

Francois Pierre Luus, francoisluus / KGReasoning GitHub post Mar. 2, 2021 pp. 1-3. Grace Period Disclosure.

* cited by examiner $\exists V,T \cdot p(a,V) \wedge q(V,T) \wedge \neg r(b,T)$ $f_q(f_p(a) \wedge \neg f_r(b)$

INTERSECT

NEGATION $\neg f_r(b)$ $f_r(b)$  $f_r$ $f_q(f_p(a))$  $f_q$ $f_p(a)$  $f_p$

DEPENDENCY GRAPH $a$ $b$ $c$ $r$ $r'$

FIG.  8

| | FIRST-ORDER LOGIC | SKOLEM SET LOGIC |
|---|---|---|
| 1p | $\exists T.\, p(a,T)$ | $f_p(a)$ |
| 2p | $\exists V,T.\, p(a,V) \wedge q(V,T)$ | $f_q(f_p(a))$ |
| 3p | $\exists V,W,T.\, p(a,V) \wedge q(V,W)$ $\wedge\ r(W,T)$ | $f_r(f_q(f_p(a)))$ |
| 2i | $\exists T.\, p(a,T) \wedge q(b,T)$ | $f_p(a) \wedge f_q(b)$ |
| 3i | $\exists T.\, p(a,T) \wedge q(b,T) \wedge r(c,T)$ | $f_p(a) \wedge f_q(b) \wedge f_r(c)$ |
| pi | $\exists V,T.\, p(a,V) \wedge q(V,T) \wedge r(b,T)$ | $f_q(f_p(a)) \wedge f_r(b)$ |
| ip | $\exists V,T.\, [p(a,V) \wedge q(b,V)] \wedge r(V,T)$ | $f_r(f_p(a) \wedge f_q(b))$ |
| 2in | $\exists T.\, p(a,T) \wedge \neg q(b,T)$ | $f_p(a) \wedge \neg f_q(b)$ |
| 3in | $\exists T.\, p(a,T) \wedge q(b,T) \wedge \neg r(c,T)$ | $f_p(a) \wedge f_q(b) \wedge \neg f_r(c)$ |
| pin | $\exists V,T.\, p(a,V) \wedge q(V,T) \wedge \neg r(b,T)$ | $f_q(f_p(a)) \wedge \neg f_r(b)$ |
| pni | $\exists V,T.\, p(a,V) \wedge \neg q(V,T) \wedge r(b,T)$ | $\neg f_q(f_p(a)) \wedge f_r(b)$ |
| inp | $\exists V,T.\, [p(a,V) \wedge \neg q(b,V)] \wedge r(V,T)$ | $f_r(f_p(a) \wedge \neg f_q(b))$ |
| 2u | $\exists T.\, p(a,T) \vee q(b,T)$ | $f_p(a) \vee f_q(b)$ |
| up | $\exists V,T.\, [p(a,V) \vee q(b,V)] \wedge r(V,T)$ | $f_r(f_p(a) \vee f_q(b))$ |

FIG.  9

- RELATION: $\exists T.\, r(a,T)$ GIVES $f_r(a)$.
- NEGATION: $\exists T.\, \neg r(a,T)$ GIVES $\neg f_r(a)$.
- CONJUNCTION: $\exists T.\, r(a,T) \wedge q(b,T)$ GIVES $f_r(a) \wedge f_q(b)$.
- DISJUNCTION: $\exists T.\, r(a,T) \vee q(b,T)$ GIVES $f_r(a) \vee f_q(b)$.
- MULTI-HOP: $\exists T.\, r(a,V_1) \wedge q(V_1, V_2) \wedge \ldots \wedge z(V_{n-1}, T)$ HAS CHAIN-LIKE RELATIONS THAT GIVES $f_z \ldots (f_q(f_r(a)))$.

FIG. 10

| MODEL | DATASET 1 | | | | | | DATASET 2 | DATASET 3 |
|---|---|---|---|---|---|---|---|---|
| | 2in | 3in | inp | pin | pni | AVG | AVG | AVG |
| LogicE | 4.9 | 8.2 | 7.7 | 3.6 | 3.5 | 5.6 | 12.5 | 6.2 |
| +BOUNDS | 4.9 | 8.0 | 7.3 | 3.6 | 3.5 | 5.5 | 11.7 | 6.3 |
| BetaE | 5.1 | 7.9 | 7.4 | 3.6 | 3.4 | 5.4 | 11.8 | 5.9 |

FIG. 11

| MODEL | DATASET 1 | | | | DATASET 3 | | | | AVG |
|---|---|---|---|---|---|---|---|---|---|
| | i | n | p | ALL | i | n | p | ALL | |
| *NO BOUNDS WITH ATTENTION (LogicE)* | | | | | | | | | |
| luk | 14.4 | 5.0 | 13.2 | 15.8 | 18.8 | 6.5 | 19.5 | 21.5 | 18.7 |
| min | 14.4 | 5.0 | 13.2 | 15.7 | 18.6 | 6.6 | 19.4 | 21.5 | 18.6 |
| prod | 14.4 | 5.0 | 13.3 | 15.8 | 18.7 | 6.6 | 19.4 | 21.5 | 18.7 |
| *BOUNDS WITH ATTENTION (+BOUNDS)* | | | | | | | | | |
| luk | 13.9 | 5.0 | 12.9 | 15.3 | 18.7 | 6.5 | 19.0 | 21.3 | 18.3 |
| min | 13.9 | 5.0 | 12.7 | 15.2 | 18.5 | 6.6 | 19.0 | 21.3 | 18.2 |
| prod | 14.0 | 5.0 | 13.0 | 15.4 | 18.6 | 6.7 | 19.1 | 21.3 | 18.4 |
| BetaE | 13.7 | 4.8 | 12.6 | 15.0 | 17.5 | 6.1 | 17.0 | 19.6 | 17.3 |
| *BOUNDS WITH NO ATTENTION* | | | | | | | | | |
| luk | 12.7 | 5.1 | 11.7 | 14.1 | 16.1 | 6.8 | 16.7 | 18.9 | 16.5 |
| min | 13.0 | 5.4 | 11.8 | 14.4 | 16.4 | 7.1 | 16.8 | 19.1 | 16.8 |
| prod | 12.9 | 5.3 | 11.9 | 14.3 | 16.5 | 7.1 | 17.0 | 19.2 | 16.8 |
| BetaE | 11.6 | 5.0 | 11.7 | 13.3 | 15.4 | 5.7 | 14.8 | 17.5 | 15.4 |

*FIG. 12*

| MODEL | GENERALIZATION ON DATASET 2 | | | | | | | | | | | | DATASET 1 | DATASET 3 |
|---|---|---|---|---|---|---|---|---|---|---|---|---|---|---|
| | 1p | 2p | 3p | 2i | 3i | pi | ip | 2u DNF | 2u DM | up DNF | up DM | AVG | AVG | AVG |
| LogicE | 41.3 | 11.8 | 10.4 | 31.4 | 43.9 | 23.8 | 14.0 | 13.4 | 13.1 | 10.2 | 9.8 | 22.3 | 44.1 | 28.6 |
| +BOUNDS | 40.5 | 11.4 | 10.1 | 29.8 | 42.2 | 22.4 | 13.4 | 13.0 | 12.9 | 9.8 | 9.6 | 21.4 | 40.8 | 28.0 |
| BETAE | 39.0 | 10.9 | 10.0 | 28.8 | 42.5 | 22.4 | 12.6 | 12.4 | 11.1 | 9.7 | 9.9 | 20.9 | 41.6 | 24.6 |
| Q2B | 40.6 | 9.4 | 6.8 | 29.5 | 42.3 | 21.2 | 12.6 | 11.3 | – | 7.6 | – | 20.1 | 38.0 | 22.9 |
| GQE | 35.0 | 7.2 | 5.3 | 23.3 | 34.6 | 16.5 | 10.7 | 8.2 | – | 5.7 | – | 16.3 | 28.0 | 18.6 |

*FIG. 13*

(a) GENERALIZATION ON DATASET 2 (Q2B DATASETS)

| MODEL | 1p | 2p | 3p | 2i | 3i | pi | ip | 2u | up | AVG | DATASET 1 AVG | DATASET 3 AVG |
|---|---|---|---|---|---|---|---|---|---|---|---|---|
| LogicE | 46.1 | 28.6 | 24.8 | 34.8 | 46.5 | 23.7 | 12.0 | 27.7 | 21.1 | 29.5 | 54.9 | 39.3 |
| +BOUNDS | 45.0 | 26.6 | 23.0 | 32.0 | 44.1 | 22.1 | 11.1 | 25.5 | 20.4 | 27.7 | 50.3 | 38.6 |
| EmQL | 37.7 | 34.9 | 34.3 | 44.3 | 49.4 | 42.3 | 40.8 | 8.7 | 28.2 | 35.8 | 49.5 | 46.8 |
| CQD-Beam | 51.2 | 28.8 | 22.1 | 35.2 | 45.7 | 24.9 | 12.9 | 28.4 | 12.1 | 29.0 | 68.0 | 37.5 |
| BETAE | 43.1 | 25.3 | 22.3 | 31.3 | 44.6 | 22.3 | 10.2 | 26.6 | 18.0 | 27.1 | 51.4 | 33.8 |
| Q2B | 46.7 | 24.0 | 18.6 | 32.4 | 45.3 | 20.5 | 10.8 | 23.9 | 19.3 | 26.8 | 48.4 | 30.6 |
| GQE | 40.5 | 21.3 | 15.5 | 29.8 | 41.1 | 18.2 | 8.5 | 16.9 | 16.3 | 23.1 | 38.7 | 24.8 |

(b) ENTAILMENT ON DATASET 2 (Q2B DATASETS)

| MODEL | 1p | 2p | 3p | 2i | 3i | pi | ip | 2u | up | AVG | DATASET 1 AVG | DATASET 3 AVG |
|---|---|---|---|---|---|---|---|---|---|---|---|---|
| LogicE | 81.5 | 54.2 | 46.0 | 58.1 | 67.1 | 44.0 | 28.5 | 66.6 | 40.8 | 54.1 | 65.5 | 85.3 |
| +BOUNDS | 73.7 | 46.4 | 38.9 | 49.8 | 61.5 | 37.2 | 22.0 | 54.6 | 35.1 | 46.6 | 58.4 | 80.1 |
| EmQL | 100.0 | 99.5 | 94.7 | 92.2 | 88.8 | 93.0 | 91.5 | 94.7 | 93.7 | 94.2 | 91.4 | 98.8 |
| - SKETCH | 89.3 | 55.7 | 39.9 | 62.9 | 63.9 | 54.7 | 51.9 | 53.8 | 44.7 | 57.4 | 55.5 | 82.5 |
| BETAE | 77.9 | 52.6 | 44.5 | 59.0 | 67.8 | 42.2 | 23.5 | 63.7 | 35.1 | 51.8 | 60.6 | 80.2 |
| Q2B | 58.5 | 34.3 | 28.1 | 44.7 | 62.1 | 23.9 | 11.7 | 40.5 | 22.0 | 36.2 | 43.7 | 51.1 |
| GQE | 56.4 | 30.1 | 24.5 | 35.9 | 51.2 | 25.1 | 13.0 | 25.8 | 22.0 | 31.6 | 43.7 | 49.8 |

FIG. 14

SPEARMAN'S RANK CORRELATION ON DATASET 2

| MODEL | 1p | 2p | 3p | 2i | 3i | pi | ip | 2in | 3in | inp | pin | pni | AVG | DATASET 1 AVG | DATASET 3 AVG |
|---|---|---|---|---|---|---|---|---|---|---|---|---|---|---|---|
| ENTROPY | 0.65 | 0.67 | 0.72 | 0.61 | 0.51 | 0.57 | 0.60 | 0.69 | 0.54 | 0.62 | 0.61 | 0.67 | 0.62 | 0.58 | 0.61 |
| INTERVAL | 0.61 | 0.58 | 0.58 | 0.64 | 0.64 | 0.54 | 0.49 | 0.58 | 0.50 | 0.41 | 0.49 | 0.60 | 0.56 | 0.51 | 0.53 |
| BETAE | 0.40 | 0.50 | 0.57 | 0.60 | 0.52 | 0.54 | 0.44 | 0.69 | 0.58 | 0.51 | 0.47 | 0.67 | 0.54 | 0.49 | 0.55 |
| Q2B | 0.18 | 0.23 | 0.27 | 0.35 | 0.44 | 0.36 | 0.20 | – | – | – | – | – | – | – | – |

PEARSON CORRELATION COEF. ON DATASET 2

| MODEL | 1p | 2p | 3p | 2i | 3i | pi | ip | 2in | 3in | inp | pin | pni | AVG | DATASET 1 AVG | DATASET 3 AVG |
|---|---|---|---|---|---|---|---|---|---|---|---|---|---|---|---|
| ENTROPY | 0.33 | 0.53 | 0.61 | 0.45 | 0.37 | 0.37 | 0.47 | 0.58 | 0.44 | 0.52 | 0.49 | 0.57 | 0.48 | 0.46 | 0.52 |
| BETAE | 0.23 | 0.37 | 0.45 | 0.36 | 0.31 | 0.32 | 0.33 | 0.46 | 0.41 | 0.39 | 0.36 | 0.48 | 0.37 | 0.36 | 0.4 |
| Q2B | 0.02 | 0.19 | 0.26 | 0.37 | 0.49 | 0.34 | 0.20 | – | – | – | – | – | – | – | – |

FIG. 15

ANSWER SIZE PREDICTION ERROR ON DATASET 2

| MODEL | 1p | 2p | 3p | 2i | 3i | pi | ip | 2in | 3in | inp | pin | pni | AVG | DATASET 1 AVG | DATASET 3 AVG |
|---|---|---|---|---|---|---|---|---|---|---|---|---|---|---|---|
| LOGICE | 78 | 83 | 86 | 82 | 94 | 89 | 86 | 81 | 79 | 81 | 81 | 81 | 83 | 87 | 80 |
| BETAE | 111 | 96 | 97 | 97 | 97 | 95 | 97 | 97 | 95 | 97 | 97 | 98 | 98 | 95 | 95 |
| Q2B | 191 | 101 | 100 | 310 | 780 | 263 | 103 | – | – | – | – | – | – | – | – |

*FIG. 17*

LOGIC EMBEDDINGS FOR COMPLEX QUERY ANSWERING

The following disclosure(s) are submitted under 35 U.S.C. 102(b)(1)(A):

Francois Pierre Luus, Prithviraj Sen, Pavan Kapanipathi, Ryan Nelson Riegel, Ndivhuwo Makondo, Thabang Doreen Lebese, and Alexander Gray, Logic Embeddings for Complex Query Answering, arXiv preprint arXiv: 2103.00418v1. 2021 Feb. 28.

Francois Pierre Luus, francoisluus/KGReasoning GitHub post Mar. 2, 2021 pages 1-3.

BACKGROUND

The present invention relates to the electrical, electronic and computer arts, and more specifically, to artificial intelligence (AI) and the like.

Answering logical queries over incomplete knowledge bases is challenging because: 1) it calls for implicit link prediction, and 2) brute force answering of existential first-order logic queries is exponential in the number of existential variables. Recent work on query embeddings provides fast querying, but most approaches model set logic with closed regions, and thus lack negation. Query embeddings that do support negation use densities that suffer drawbacks: 1) only improvise logic, 2) use expensive distributions, and 3) poorly model answer uncertainty.

Reasoning over knowledge bases is fundamental to AI, but still challenging since most knowledge graphs (KGs) are large and incomplete. Answering complex queries is an important use of KGs, but missing facts makes queries unanswerable under normal inference.

SUMMARY

Principles of the invention provide techniques for logic embeddings for complex query answering. In one aspect, an exemplary method for improving the technological process of computerized answering of logical queries over incomplete knowledge bases includes obtaining a first order logic query; with a trained, computerized neural network, converting the first order logic query into a logic embedding; and answering the first order logic query using the logic embedding.

In another aspect, an exemplary method is provided for improving the technological process of training a computerized neural network to convert first order logic queries into logic embeddings for answering of the logical queries over incomplete knowledge bases. The method includes training the computerized neural network to embed a given query close to at least one answer of the given query, and far from negative samples, by minimizing a query answering loss, wherein the query answering loss is given by a specific mathematical relationship disclosed herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Some embodiments may not have these potential advantages and these potential advantages are not necessarily required of all embodiments. For example, one or more embodiments provide:

ability to perform set logic with real-valued logic, ability to characterize subsets with truth bounds, ability to correlate bounds with uncertainty, improved accuracy with well-studied t-norms, ability to perform negation in logical queries, ability to infer missing information in the knowledge graph, improved accuracy of machine learning (ML) link and answer size predictions, faster, simplified calculations compared to prior-art Beta embeddings, faster compute time for both ML training and inference/ reduced CPU time as compared to prior-art Beta embeddings, with comparable memory size and number of parameters, and improved prediction of answer size.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 shows complex logical query structures useful in connection with one or more aspects of the invention;

FIG. 9 shows example sentence forms, according to an aspect of the invention;

FIG. 10 shows exemplary MRR results, achieved according to an aspect of the invention;

FIG. 11 shows exemplary validation of MRR averages, achieved according to an aspect of the invention;

FIG. 12 shows exemplary test MRR results, achieved according to an aspect of the invention;

FIG. 13 shows exemplary Hits@3 results, achieved according to an aspect of the invention;

FIG. 14 shows exemplary Spearman's and Pearson's results, achieved according to an aspect of the invention;

FIG. 15 shows exemplary answer size prediction mean absolute error, achieved according to an aspect of the invention;

FIG. 17 depicts a computer system that may be useful in implementing one or more aspects and/or elements of the invention, also representative of a cloud computing node according to an embodiment of the present invention.

DETAILED DESCRIPTION

Figure 1:
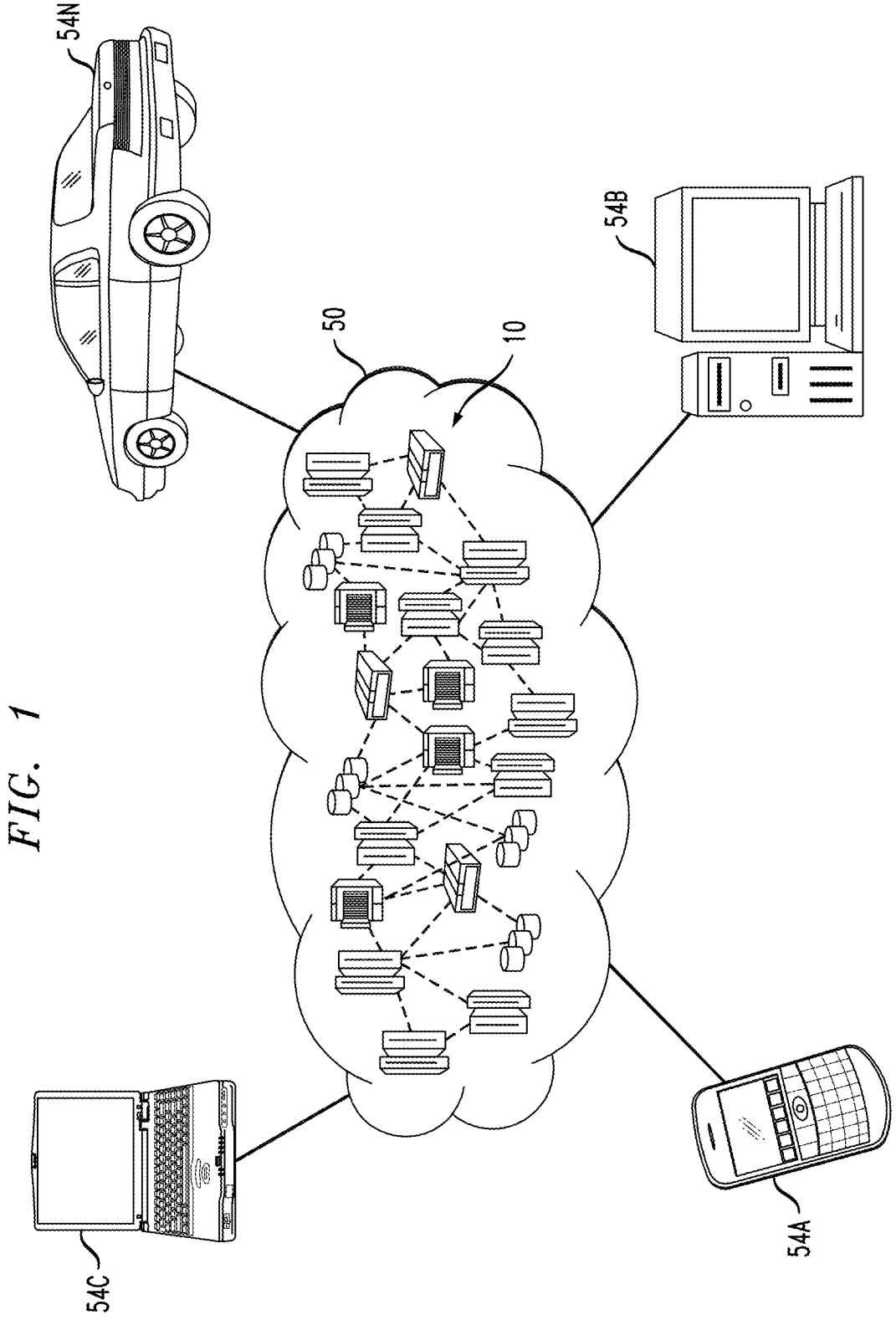
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
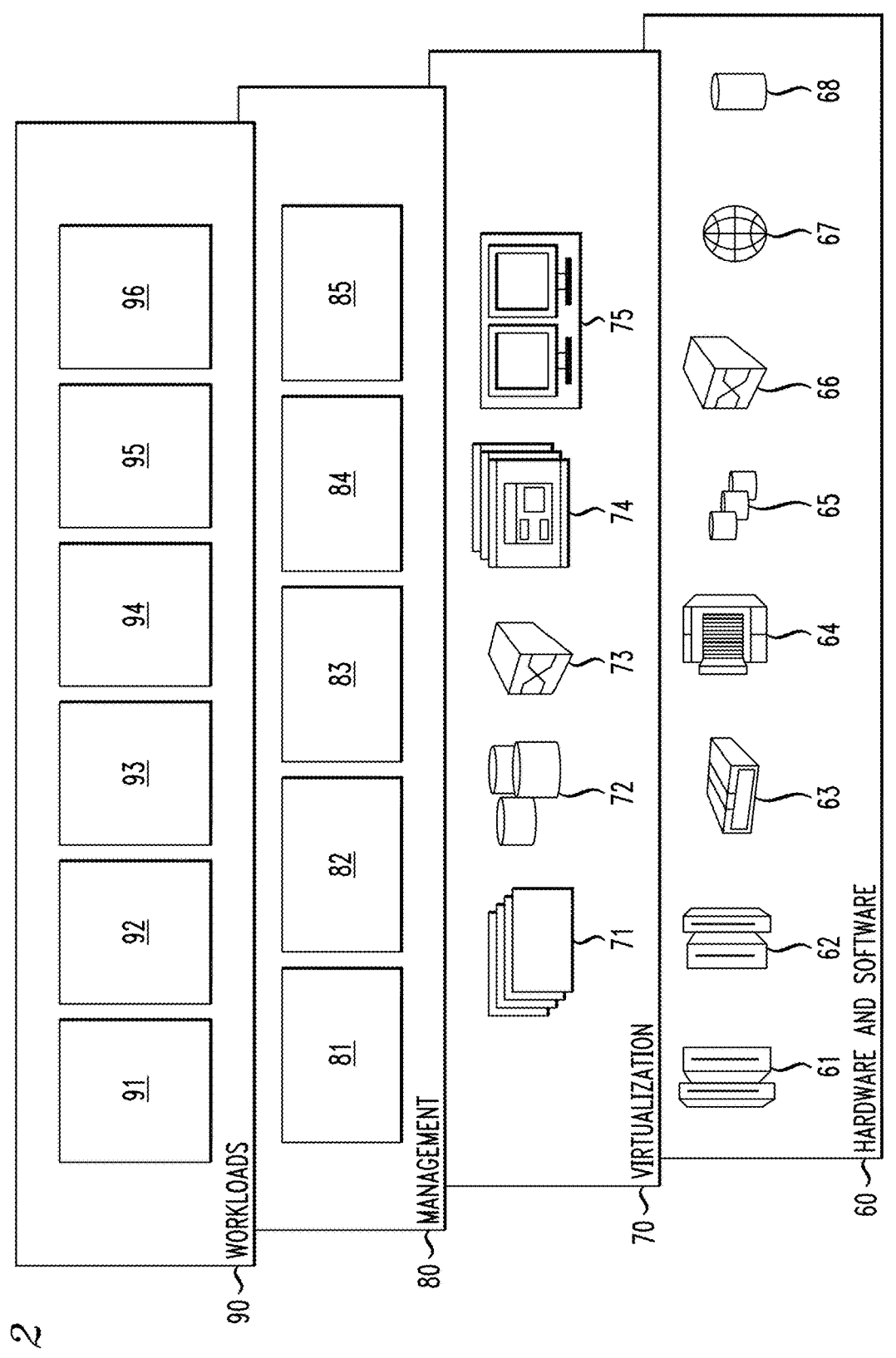
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 (or one or more elements thereof) to provide logic embeddings for complex query answering; for example, software deployed as a cloud-based service using, for example, PYTHON code.

Aspects of the invention provide logic embeddings, an approach to embedding complex queries that uses Skolemization to eliminate existential variables for efficient querying. One or more embodiments support negation, while improving on density approaches. Indeed, one or more embodiments: 1) integrate well-studied t-norm logic and directly evaluate satisfiability, 2) simplify modeling with truth values, and/or 3) model uncertainty with truth bounds. Logic embeddings are competitively fast and accurate in query answering over large, incomplete knowledge graphs, outperform on negation queries, and in particular, provide improved modeling of answer uncertainty as evidenced by a superior correlation between answer set size and embedding entropy, as we noted in our experiments.

Figure 3:
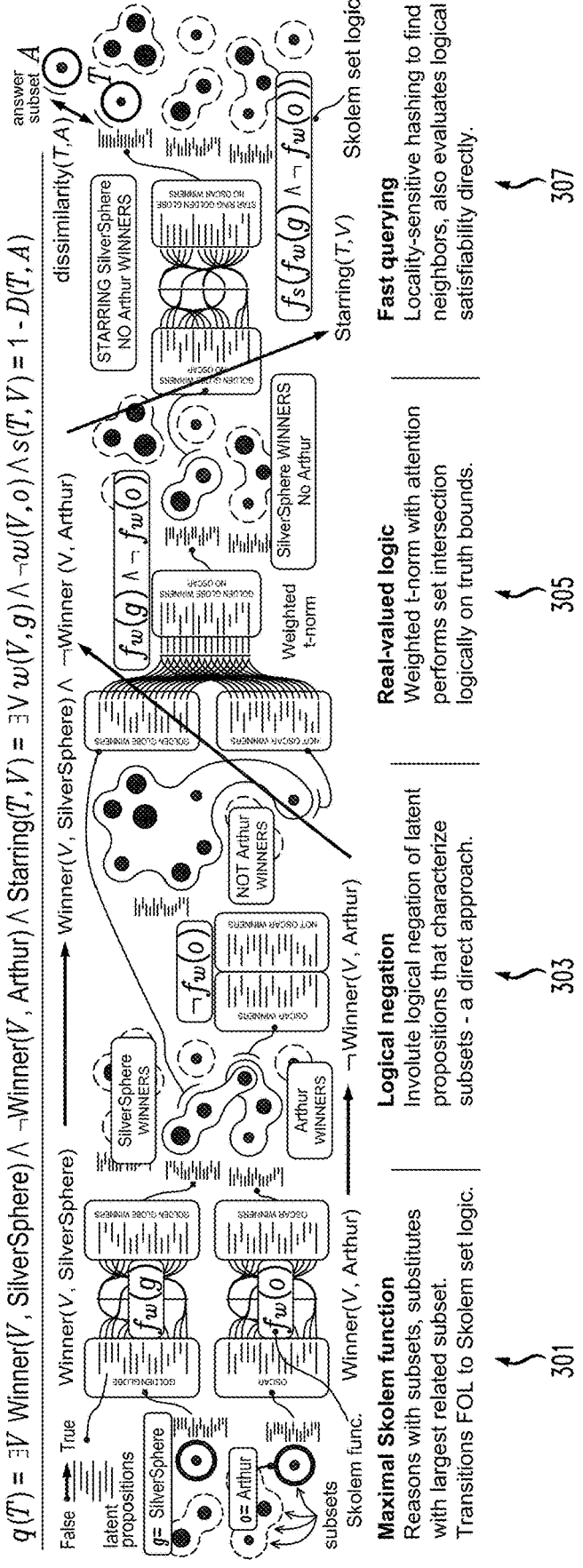
FIG. 3 presents an example of logic embeddings performing real-valued logic on latent propositions, according to an aspect of the invention.

Suppose for illustrative purposes that there are two famous film awards called the "Silver Sphere" and "Arthur." FIG. 3 shows an example of handling a logic query representing the natural language question "Which films star Silver Sphere winners that have not also won an Arthur?" Answering this query involves multiple steps of KG traversal and existential first-order logic (FOL) operations, each producing intermediate entities. One or more embodiments consider queries involving missing facts, which means there is uncertainty about these intermediates that complicates the task. Two main approaches to answering such multi-hop queries involving missing facts are (i) sequential path search and (ii) query embeddings. Sequential path search grows exponentially in the number of hops, and requires approaches such as reinforcement learning or beam search that have to explicitly track intermediate entities. Query embeddings prefer composition over search, for fast (sublinear) inference and tractable scaling to more complex queries. While relation functions have to learn knowledge, composition can otherwise use inductive bias to model logic operators directly to alleviate learning difficulty.

FIG. 3 shows logic embeddings performing real-valued logic on latent propositions (latents), an array of truth bounds that describes any subset of entities. Portion 301 shows that a learned Skolem function maps latents of singleton Arthur to latents of maximal subset of Arthur winners, and similarly for Silver sphere; portion 303 shows that the complement of a subset is logical negation of latents that identify non-Arthur winners; portion 305 shows that an Intersection of subsets is logical conjunction of latents that identify "Silver sphere winners that have not also won an Arthur"; and portion 307 shows that $q(T)=1-D(T, A)$ measures logic satisfiability of candidate answer set directly, while nearest neighbors to intermediate embeddings can provide some explainability.

Figure 4:
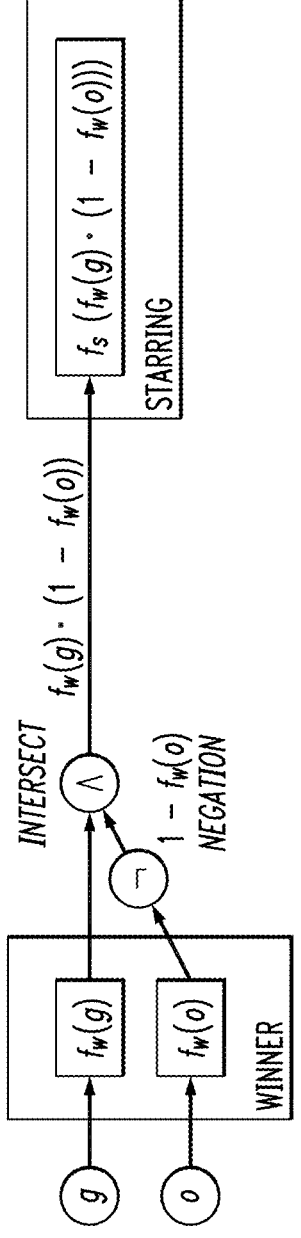
FIG. 4 shows a computation graph for FIG. 3, according to an aspect of the invention.

FIG. 4 shows a computation graph for FIG. 3 with product t-norm for intersect. Nodes are truth vectors that identify entity subsets. Embedding query logic reduces to a simple vectorized calculation.

Figure 5:
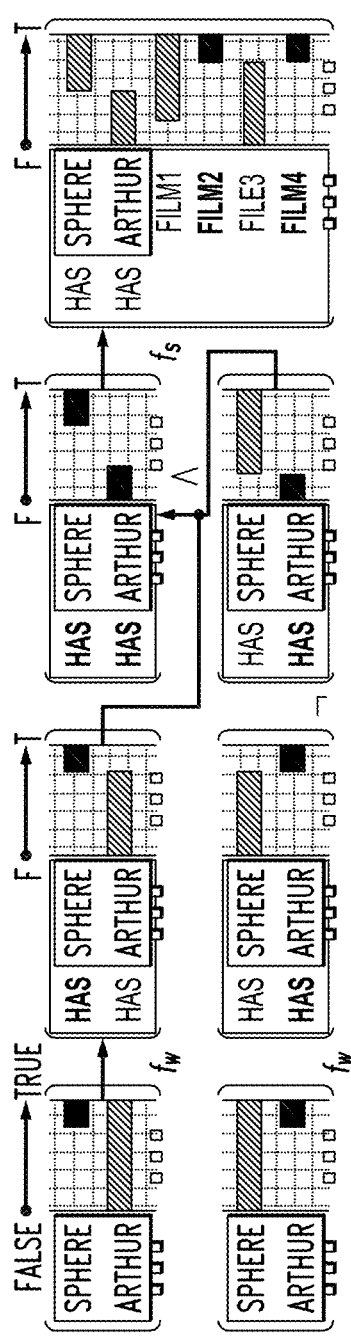
FIG. 5 shows exemplary intuition for truth bounds for FIG. 3, according to an aspect of the invention.

FIG. 5 shows intuition behind truth bounds for FIG. 3: propositions identify features, relations substitute propositions, negation flips truths, intersect retains common features. The final query embedding is closer to propositions of film $\sqrt{2/4}$ (answer set) than film $\sqrt{1/3}$.

Query embeddings typically need to (a) predict missing knowledge, (b) model logic operations, and (c) model answer uncertainty. Some prior art approaches model conjunction as intersection of boxes, but are unable to model negation, inasmuch as the complement of a closed region is not closed. Beta embeddings model conjunction as a weighted interpolation of Beta distributions and negation as the inversion of density, but improvise logic and depend on neural versions of logic conjunction for better accuracy.

Some prior-art approaches model entities as points, and so are unable to naturally express uncertainty, while others use poorly differentiable geometric shapes unsuited to uncertainty calculations. Beta embeddings naturally model uncertainty with densities and do support complex query embedding, although the densities of the Beta embedding approach have no closed form and entropy calculations are expensive.

Beta embeddings are query embeddings that supports negation and model uncertainty; however, they abruptly convert first-order logic to set logic, only improvise set logic with densities, require expensive Beta distribution (no closed form), and dissimilarity uses divergence that needs integration.

One or more embodiments overcome one or more issues in the prior art, providing logic embeddings to address issues with (1) formulation of set logic in terms of first-order logic, (2) use of well-studied logic, (3) simple representation with truth bounds, and (4) a fast, symmetric dissimilarity measure.

Logic embeddings are a compositional query embedding with inductive bias of real-valued logic, for answering (with uncertainty) existential ($\exists$) FOL multi-hop logical queries over incomplete KGs. This exemplary approach represents entity subsets with arrays of truth bounds on latent propositions that describe and compress their features and relations. This allows the direct use of real-valued logic to filter and identify answers. Truth bounds [l, u]: $0 \leq l \leq u \leq 1$ express uncertainty about truths, stating truth can be a value range (e.g., unknown [0, 1]). Sum of bound widths model uncertainty, which correlates to answer size. Now, intersection is simply conjunction ($\wedge$) of bounds to retain only shared propositions, union is disjunction ($\vee$) to retain all propositions, and complement is negation ($\neg$) of bounds to find subsets with opposing propositions.

Some pertinent aspects of logic embeddings include (a) ability to perform set logic with real-valued logic, (b) ability to characterize subsets with truth bounds, and (c) ability to correlate bounds with uncertainty. Some potential benefits of one or more embodiments include (a) improved accuracy with well-studied t-norms, (b) faster, simplified calculations, and (c) improved prediction of answer size. Some embodiments may not have these potential advantages and these potential advantages are not necessarily required of all embodiments.

Indeed, one or more embodiments employing logic embeddings address issues of poor logic and uncertainty modeling, and computational expense, of current methods, by providing, for example:

Direct logic: defines Skolem set logic via maximal Skolemization of first-order logic to embed queries, where proximity of logic embeddings directly evaluates logic satisfiability of first-order logic queries.

Improved logic: performs set intersection as logic conjunction over latent propositions with t-norms, often used for intersection of fuzzy sets. We have found that decomposition providing weak, strong, and nilpotent conjunctions shows higher accuracy than idempotent conjunction via density interpolation.

Direct uncertainty: truth bounds naturally model uncertainty and have fast entropy calculation. Both entropy and bounds width show superior correlation to answer size.

Improved measure: measures dissimilarity with simple L1-norm, which improves training speed and accuracy.

Pertinent aspects of some embodiments also include (i) introduction of Skolem set logic to enable lifted inference and/or (ii) definition of logic embeddings to enable logic query composition. We have also conducted a new cardinality prediction experiment showing the benefit of truth bounds according to one or more embodiments.

Querying with Skolem Set Logic

We define an existential first-order language $\mathscr{L}$ signature contains a set of functional symbols $\mathscr{F}$ and a set of predicate symbols $\mathscr{R}$. The alphabet of $\mathscr{L}$ includes the logic symbols of conjunction ($\wedge$), disjunction ($\vee$), negation ($\neg$), and existential quantification ($\exists$). The semantics of $\mathscr{L}$ interprets the domain of discourse as a family of subsets $\mathscr{C} \subset 2^{\mathscr{E}}$, , where $2^{\mathscr{E}}$ denotes the power set of a set of entities $\mathscr{E}$. This allows for lifted inference where variables and terms map to entity subsets, which are single elements in the discourse.

Sentences of $\mathscr{L}$ express relational knowledge, e.g., a binary predicate $r \in \mathscr{R}$ relates two unordered subsets via function r: $\mathscr{C} \times \mathscr{C} \rightarrow [0, 1]$ that evaluates to a real truth value. However, the underlying knowledge is predicated under a different signature on domain of discourse $\mathscr{E}$, relating entities via r': $\mathscr{E} \times \mathscr{E} \rightarrow \{$False, True$\}$. Subsets c, $t \in \mathscr{C}$ are related via r(c, t), with the union $t = \cup \forall_v \in_c t'$ over all underlying propositions r'(v, t') for each entity $v \in c$ (see FIG. 7).

Existential quantification in $\mathscr{L}$ results in sentences that are always true in the underlying interpretation, because the nullset is present in $\mathscr{C}$. Now, introduce maximal quantification via a modified Skolem function to make $\mathscr{L}$ useful.

Definition 1 (Maximal Skolem function). A maximal Skolem function $f_r \in \mathscr{F}$: $\mathscr{C} \rightarrow \mathscr{C}$ assigns the maximal subset c to an existentially quantified variable T so that $\exists T.r(\alpha, T) \leftrightarrow r(\alpha, f_r(\alpha))$ (equisatisfiable). The function receives input element $\alpha \in \mathscr{C}$ and outputs the related subset c over $\mathscr{E}$ with the largest cardinality, so that:

$$f_r(\alpha) = c : |c'| \leq |c|, c, \forall c' \in \mathcal{C}.$$

Formulas $\mathscr{L}$ in such as r($\alpha$, T) can thus convert to sentences $\exists T.r(\alpha, T)$ by quantification over free variables, and the largest satisfying assignment to target variable T:r($\alpha$, T) obtained via maximal Skolemization $f_r(\alpha)$ then subsumes all valid groundings in the underlying interpretation over $\mathscr{E}$. Prior-art "relation following" is similar where r($\alpha$, T)=$\{t'|\exists v \in a$: r'(v, t')$\}$. Normal Skolem functions are different as they only map to single entities.

Skolem set logic: This is set logic that involves Skolem functions that substitute related subsets. Now, introduce notation for maximal Skolemization of sentences in $\mathscr{L}$ that represents set logic on Skolem terms in their underlying interpretation over $\mathscr{E}$. Evaluation in $\mathscr{L}$ of conjunction $\wedge$, disjunction $\vee$, and negation $\neg$ correspond to intersection, union, and complement in Skolem set logic, respectively. Skolem set logic reuses operators $\wedge$, $\vee$, $\neg$, to signify that it performs direct real-valued logic on truth vectors of its terms. Skolem set logic usages are noted to avoid confusion with FOL.

Sentence forms and their Skolem set logic representations ($\wedge$, $\vee$, extends trivially to more inputs) for target variable T, given anchor elements a, b (assigned subsets) and relation predicates (r, . . . , z) include the conversion rules in FIG. 9.

Query formulas: Consider query formulas defined over $\mathscr{E}$ with m anchor entities $a_i \in \mathscr{E}$, a single free target variable T, and n bound variables $V_j$. Query answering assigns the subset $\{t \in \mathscr{E}, \in \mathscr{C}$ of entities to T that satisfy:

$$\exists V_1, V_2, \ldots, V_n \cdot q(a_1, a_2, \ldots, a_m, V_1, V_n, T). \quad (1)$$

Recast formulas into $\mathscr{C}$ by converting anchor entities to singleton subsets, then quantify T to maximally Skolemize the sentence and derive its Skolem set logic term $f(a_1; a_2, \ldots, a_m)$ for T given the anchor entities.

The dependency graph of formula (1) includes vertices $\{\alpha_1, \ldots, \alpha_m, V_1, \ldots, V_n, T\}$ and a directed edge for each vertex pair (x, y) related inside the formula, e.g., via r(x, y). Queries are valid when the dependency graph is a single-sink acyclic graph with anchor entities as source nodes, and an equivalent to the original formula can then be recovered from Skolem set logic.

Logic Embeddings

One or more embodiments provide an approach for positive inference on queries of form (1), requiring only Skolem set logic, but also advantageously support:

Lifted inference: Inference over subsets of entities, needing fewer actions than with single-entity inference;

Knowledge integration: Underlying single-entity knowledge over $\mathcal{V}$ integrates over subsets from $\mathcal{C}$, Generalization: Use of subset similarities to predict absent knowledge with an uncertainty measure.

The powerset $\mathcal{C}$ over entities $\mathcal{V}$ from a typical KB is extremely large, so discrete approaches to achieve the above with non-uniform subset representations are likely intractable.

Set embeddings: Consider set embeddings that map $\mathcal{C}$ to a continuous space $\mathcal{M}$, so these images of subsets approximately preserve their relationships from $\mathcal{C}$. Such set embeddings have metric properties such as the volume of subsets, not usually considered by graph embeddings. Set embeddings have the following properties:

Uniform: Enables standard parameterization, simplifies memory structures and related computation;

Continuous: Differentiable, enables optimization;

Permutation-invariant: Subset elements unordered;

Uncertainty: Subset size corresponds to entropy;

Proximity: Relatively preserves subset dissimilarities.

Definition 2 (Logic embeddings). Logic embeddings are set embeddings that characterize subsets with latent propositions, and perform set logic on subsets via logic directly over their latent propositions.

Logic embeddings inherit the aforementioned properties and benefits of set embeddings, but are also:

Logical: Logic over truth values in embeddings performs set logic, and proximity correlates with satisfiability;

Contextual: Latent propositions integrate select knowledge depending on the sub set;

Open-world: Accepts and integrates unknown or partially known knowledge and inferences.

Logic embeddings also share query embedding advantages of efficient answering, generalization, and full logic support:

Fast querying: Obtains answers closest to query embedding in sublinear time, unlike subgraph matching with exponential time in query size.

General querying: Generalizes to unseen query forms.

Implicit prediction: Implicitly imputes missing relations, and avoids exhaustive link prediction subgraph matching requires and scales poorly on.

Natural modeling: Supports intuitive set intersection, unlike point embeddings.

Uncertainty: Models answer size with embedding entropy or truth bounds (one or more embodiments).

Fundamental support: Handles negation (and disjunction via De Morgan's law), unlike box embeddings where complements are not closed regions (and union resorts to disjunctive normal form).

Latent propositions: A logic embedding keeps truth values with associate distribution $p_x \in \mathcal{M}$ on latent propositions of features and properties that characterize and distinguish subset $X \subset \mathcal{V}$. Subset entities $x \in X$ may share a similar relation $r(x, Y)$ to a particular subset Y, where latent propositions can integrate such identifying relations. Logic embeddings should be contextual given the limited embedding capacity, as only some relations may be relevant to define a particular subset.

Uncertainty: Represent volume in embedding space with lower and upper bounds [l, u] on truth values, to express uncertainty and allow correlation of embedding entropy of a subset with its cardinality. Use truth bounds that admit the open-world assumption and have probabilistic semantics to interpret known ($l \leq u$) and unknown ([0, 1]) states.

The logic embedding for $X \subset \mathcal{V}$ is an n-tuple $S_X = ([l_i, u_i]: \in [0, 1])$ $$ {}_{i=1}^{n} $$

of lower and upper bound pairs ($l_i \leq u_i$) that represents an n-tuple $px = (P_i)$ $$ {}_{i=1}^{n} $$

of uniform distributions $P_i = U(l_i \leq u_i)$, which omits contradiction $l_i > u_i$. The chain rule for differential entropy $H(px) = H(P_1, \ldots, P_n)$ of the embedding distribution applies and gives an upper-bound in terms of components $H(P_i) = \log(u_i - l_i)$, where:

$$ H(P_1, \ldots, P_n) = \sum_{i=1}^{n} H(P_i | P_1, \ldots, P_{i-1}) \leq \sum_{i=1}^{n} H(P_i) $$

Condition 1 (Uncertainty axiom): Set embeddings should (approximately) satisfy $\forall X \in \mathcal{C}$ entropy $H(p_x)$ is a monotonically increasing function of $H(U_x)$, where $U_x$ is a uniform distribution over elements of X.

Measure adherence to the uncertainty axiom with correlation between subset size |X| and entropy upper-bound $$ \sum_{i=1}^{n} H(P_i) $$

or total truth interval width $$ \sum_{i=1}^{n} (u_i - l_i), $$

and by predicting |X| from $$ h_X = [H(P_i)]_{i=1}^{n}. $$

Proximity: Subsets with high overlap should embed close by, whereas little to no overlap should result in relatively distant embeddings. Now, consider the proximity axiom.

Condition 2 (Proximity axiom): In this aspect, $\forall (X, X') \in C^2$: $D(p_x \| p_{x'})$ should positively correlate with $D(U_x \| U_{x'})$, given information divergence D.

Relative entropy is an important divergence where the family of f-divergences $D_f(p \| q) = \int p(x)/(q(x)/p(x))dx$ typically include $\log(p(x))$ or $p(x)^{-1}$ terms over finite support x $E_\chi$. Uniform distributions $U(l, u)$ in logic embeddings may not cover a $[0; 1]$ support, and may result in undefined divergence. Therefore, measure dissimilarity $D(S_x, S_{x'}) \in [0; 1]$ between logic embeddings of subsets $(X, X')$ with the expected mean of $L_1$-norms of truth bounds, where:

$$D(S_X, S_{X'}) = \sum_{i=1}^{n} \frac{\|l_i - l'_i\| + \|u_i - u'_i\|}{2n} \qquad (2)$$

Condition 3: (Satisfiability axiom). Substitution instance $q(X')$ of first-order logic formula $q(T)$ has satisfiability $1-D(S_x, S_{x'})$, where target variable $T$ has answer $X$.

Query $q(T)$ is true for answer $X$, since $1-D(S_x, S_{x'})=1$, but candidate satisfiability $q(X')$ can reduce to minimum 0 (false), depending on the dissimilarity between $X'$ and $X$.

Set logic. Conjunction and disjunction of latent propositions of subsets perform their intersection and union, respectively, unlike information-geometric set embeddings that interpolate distributions. De Morgan's law replaces disjunction $a \lor b$ with conjunction and negations $\neg(\neg a \land \neg b)$. Involute negation of $$S = \neg (\neg S) = ([l_i, u_i])_{i=1}^{n}$$

describes complement (truth bounds can share intervals with their negations, therefore complements can share latent propositions, which supports the diverse partitioning that complex queries require)

$$\neg S = ([1 - u_i, 1 - l_i])_{i=1}^{n}.$$

One or more embodiments use continuous t-norm T: $[0, 1]^k \rightarrow [0, 1]$ to perform generalized conjunction for real-valued logic, and calculate $$S' = \wedge_{j=1}^{k} S_j$$

as:

$$S' = ([T(l_i^{(1)}, \ldots, l_i^{(k)}), T(u_i^{(1)}, \ldots, u_i^{(k)})])_{i=1}^{n}.$$

Decompose any continuous t-norm into Archimedean t-norms, namely minimum/Goedel $T_{min}(t)=\min(t_l, t_k)$, product $$T_{prod}(t) = \prod_{j=1}^{k} t_j,$$

and Lukasiewicz $$T_{luk}(t) = \max\left(0, 1 - \sum_{j=1}^{k}(1 - t_j)\right),$$

which is evaluated separately to consider all prime aspects.

Contextual: Limited capacity typically requires intersection to reintegrate latent propositions contextually via a weighted t-norm: 1) continuous function $T(w, t)$ of weights $w$ and truths $t$; 2) behaves equal to the unweighted case if weights are 1; and 3) $w_j=0$ removes input $j$, and weights are in $[0, 1]$. Note that one or more embodiments use non-monotonic smoothmin($\alpha=-10$) for weighted minimum t-norm and set $l'=u'=(l+u)/2$ when $l>u$.

$$T_{min}(w, t) = \sum_{j=1}^{k} t_j w_j e^{\alpha t_j} \Big/ \sum_{j=1}^{k} w_j e^{\alpha t_j} \qquad (4)$$

$$T_{prod}(w, t) = \prod_{j=1}^{k} t_j^{w_j} \qquad (5)$$

$$T_{luk}(w, t) = \max\left(0, 1 - \sum_{j=1}^{k} w_j(1 - t_j)\right) \qquad (6)$$

Weight $$w_j^{(v)} \text{ for } (l_j^{(v)}, u_j^{(v)}),$$

the $j^{th}$ truth bounds in input $v$, depends on bounds of all conjunction inputs via attention, starting with function $g$ as:

$$g_j^{(v)} = g(l_1^{(v)}, \ldots, l_n^{(v)}, u_1^{(v)}, \ldots, u_n^{(v)}) \qquad (7)$$

Softargmax over all the conjunction inputs yields a score $$s_j^{(v)} = \exp(g_j^{(v)}) \Big/ \sum_{h=1}^{k} \exp(g_j^{(v)}),$$

which normalizes after $$w_j^{(v)} = s_j^{(v)} / \max(s_j^{(1)}, \ldots, s_j^{(k)})$$

to ensure max weight 1.

Implementation

Query embedding: Calculate a logic embedding for a single-sink acyclic query with Skolem set logic over anchor entities. Keep vectors $\{r \in \mathbb{R}^d\}$ for relation embeddings, and $\{x \in [0,1]^{2d}\}$ for logic embeddings of all entities, where $x=[l_1, \ldots, l_d, u_1, \ldots, u_d]$. To measure the "cost" of modeling uncertainty by tracking bounds, also test point truth embeddings ($l=u$), where $x=[t_1, \ldots, t_{2d}]$.

Parameterize the Skolem function $f_r(x)=f(r, x)$ with $F_1 \in \mathbb{R}^{3d \times h}$, $F_2 \in \mathbb{R}^{h \times h}$, and $F_3 \in \mathbb{R}^{h \times 2d}$ to relate $x$ to $$y = [y_l, y_l + y'_u(1 - y_l)], \text{ where } [y_l, y'_u] = f'(r, x) =$$
$$\sigma(\max(0, \max(0, [r, x]F_1)F_2)F_3)$$

activates sigmoid.

Set logic has attention that uses $g(x)=\max(0, xG_1)G_2$ with parameter matrices $G_1 \in \mathbb{R}^{2d \times 2d}$ and $G_2 \in \mathbb{R}^{2d \times d}$.

Cardinality prediction. Predict the cardinality $|X|$ of subset $X$ from the entropy vector $h_x$ of its logic embedding with $\rho \cdot \sigma(\max(0, \max(0, h_x H_1)H_2)H_3)$ scaled by $\rho$, where $H_1 \in \mathbb{R}^{dx(d/4)}$, $H_2 \in \mathbb{R}^{(d/4)x(d/16)}$, $H_3 \in \mathbb{R}^{(d/16)x1}$. With regard to this prediction, 1:1 train:test, $\rho=10^3$, 250 epochs, Adam opt. ($lr=10^{-4}$).

Query answering. An objective is to embed a query q relatively close to its answers {y} and far from negative samples {z}. We train model parameters of 1) entity logic embeddings, 2) relation embeddings, 3) Skolem function, and 4) t-norm attention, to minimize query answering loss in expression (8) below. Note, regarding the training of model parameters, hyperparameters include d=400, h=1600, γ=0.375, k=128 random negative samples, 512 batch size, 450 k epochs, Adam optimizer (lr=10⁴).

$$-\log\sigma(\gamma - D(y, q)) - \sum_{j=1}^{k}\frac{1}{k}\log\sigma(D(z_j, q) - \gamma) \quad (8)$$

Experiments

In our experiments we compared against Beta embeddings that also support arbitrary FOL (first order logic) queries and negation, where logic embeddings according to one or more embodiments (LOGICE with Lukasiewicz t-norm) show improved: 1) generalization, 2) reasoning, 3) uncertainty modeling, and 4) training speed.

Figures 6, 7:
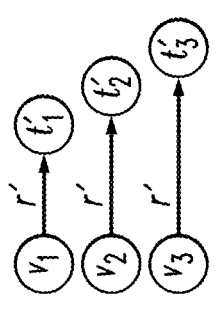
FIG. 6 shows an exemplary computation and dependency graph for the PIN query in the table of FIG. 8, according to an aspect of the invention.
FIG. 7 shows a maximum Skolem function, according to an aspect of the invention.

Datasets: In our experiments, we used two complex logical query datasets from: an embedding-based framework for reasoning over arbitrary queries with 9 query structures, and a multi-hop knowledge graph reasoning framework that adds 5 for negation. They generate random queries separately over three standard KGs with official train/valid/test splits; they are designated herein as Dataset 1, Dataset 2, and Dataset 3. Dataset 1 contains knowledge base relation triples and textual mentions of entity pairs, with hundreds of thousands of triplets, tens of thousands of entities and more than one thousand relationships. Dataset 2 is a variant of Dataset 1 where inverse relations are removed. Dataset 3 is based on a never ending language learner. The table of FIG. 8 shows the first-order logic and Skolem set logic forms of the 14 query templates; in particular, complex logical query structures in first-order logic and Skolem set logic forms. The notation is as follows: intersection (i), union (u), predicate (p), and negation (n). See FIG. 6 for an example of converting pin to Skolem set logic (computation and dependency graph for the pin query of the table of FIG. 8), mapping FOL to Skolem set logic with simple rules). FIG. 7 shows that a maximum Skolem function relates subset c via r(c, t) to the largest subset $$t = \{t'_1, t'_2, t'_3\},$$

and not to smaller subsets, e.g., $$\{t'_1\} \text{ or } \{t'_1, t'_2\},$$

even if these satisfy r'(v, t'): v∈c't'∈ t.

By way of review, we used three different KGs in our experiments. In general, KGs include triples referring to entities and relations; Triple (subject, relation, object). Subject/object are entity objects with a persistent ID, e.g. John Smith. Relation relates subject to object, e.g. birthPlace in triple (John Smith, birthPlace, USA) relates John Smith to USA. Queries are generated procedurally and/or randomly based on triples available, retaining only queries with non-zero answers.

In our experiments, we separately followed the evaluation procedures of above Q2B and BETAE datasets. The training omitted ip/pi/2u/up (table of FIG. 8) to test handling of unseen query forms. Negation was found to be challenging with 10 times fewer negation queries than conjunctive queries.

Generalization: Queries have at least one link prediction task to test generalization, where withheld data contains goal answers. In our experiments, we measured Hits@k and mean reciprocal rank (MRR) of these non-trivial answers that do not appear in the training/validation data. The table of FIG. 12 (Test MRR results (%, higher better) of LOGICE, BETAE, Q2B and GQE on answering EPFO (∃, ∨, ∧) queries (BETAE dataset)) tests both disjunctive normal form (DNF) and De Morgan's form (DM) for unions (2u/up), but we only report DNF elsewhere as it outperforms DM.

In our experiments, we found that LOGICE (Logic Embeddings in accordance with aspects of the invention) with bounds generalizes better than BETAE, Q2B, and GQE on almost all query forms in the table of FIG. 12, and further improves with point truths. LOGICE also answers negation queries more accurately than BETAE for most query forms in in the table of FIG. 10 (Test MRR results (%, higher better) of LOGICE and BETAE on answering queries with negation (BETAE dataset)). CQD-Beam does not handle negation or uncertainty, and is expensive, as it grounds candidate entities explicitly, yet LOGICE generalizes better and more efficiently in part (a) of the table of FIG. 13 (Hits@3 results (higher better) on the Q2B datasets testing (a) generalization and (b) reasoning faithfulness) on Dataset 2 and Dataset 3.

Reasoning: Logical entailment on queries without missing links tests how faithful deductive reasoning is. In our experiments, we thus trained on all splits and measured entailment accuracy in part (b) of the table of FIG. 13. LOGICE on average reasons more faithfully than BETAE, Q2B, and GQE baselines on all datasets.

EmQL is a query embedding that specifically optimizes faithful reasoning, and thus outperforms all other methods in part (b) of the table of FIG. 13. However, EmQL without its sketch method has worse faithfulness than LOGICE with point truths for Dataset 1 and Dataset 3, also EmQL does not support negation or model uncertainty like LOGICE.

Compare logic: LOGICE can intersect via minimum, product, or Lukasiewicz t-norms, which perform similarly (+/−1%) in the table of FIG. 11 (Validation MRR averages (%, higher better) for LOGICE with various t-norms and *BETAE* on training queries (*BETAE* datasets), where i, n, and p are all query forms containing intersection, negation, or relation components, respectively), while all outperform BETAE. Lukasiewicz provides superior uncertainty modeling, and so is the default choice for LOGICE. Attention via weighted t-norm improves LOGICE accuracy (+9.6%), where one hypothesis is better use of limited embedding capacity through learning weighted combinations of latent propositions.

However, BETAE improves by an average of +12.3% with a similar attention mechanism, and so has greater dependence on it, possibly because it devises intersection as interpolation of densities, whereas LOGICE uses established real-valued logic via t-norms. In particular, the BETAE intersect is idempotent while LOGICE offers weak and strong conjunctions of which Lukasiewicz offers nilpotency.

Uncertainty modeling: Correlation between differential entropy $$\sum_{i=1}^{n} H(P_i)$$

(upper-bound) and answer size (uncertainty, number of entities) is significantly higher in LOGICE than *BETAE* using both Spearman's rank correlation and Pearson's correlation coefficient in the table of FIG. 14 (Spearman's rank correlation and Pearson's correlation coefficient (higher better) between learned embedding (diff entropy and truth interval width for LOGICE, diff. entropy for BETAE, $L_1$ box size for Q2B) and the number of answers of queries (*BETAE* dataset)). Both significantly outperform uncertainty of Q2B with $L_1$ box size.

The total truth interval width $$\sum_{i=1}^{n} H(u_i - l_i)$$

of LOGICE correlates better to answer size in most cases than BETAE, and offers direct use of the probabilistic semantics of truth bounds to simplify uncertainty modeling. Note that minimizing query answering loss in Eq. (8) does not directly optimize answer cardinality, so LOGICE naturally models uncertainty only as by-product of learning to answer.

Cardinality prediction: The above evaluation aggregates entropy, but element-wise entropies $$h_X = [H(P_i)]_{i=1}^{n}$$

contain more information that was used for explicit answer size prediction. In our experiments, we trained a regression classifier to map provided uncertainties $h_x$ to answer size $|X|$, and measured mean absolute error $\||s - |X|\|/|X|$ of size prediction s.

The table of FIG. 15 (answer size prediction mean absolute error (%, lower better) with embedding entropy components for LOGICE and BETAE, and box size components for Q2B (BETAE dataset)) shows reduced cardinality prediction error of 83% with LOGICE, compared to average 96% with BETAE, indicating more informative uncertainties with LOGICE. However, these errors are still quite large, possibly because the main training objective does not directly optimize uncertainties for cardinality prediction.

Figure 16:
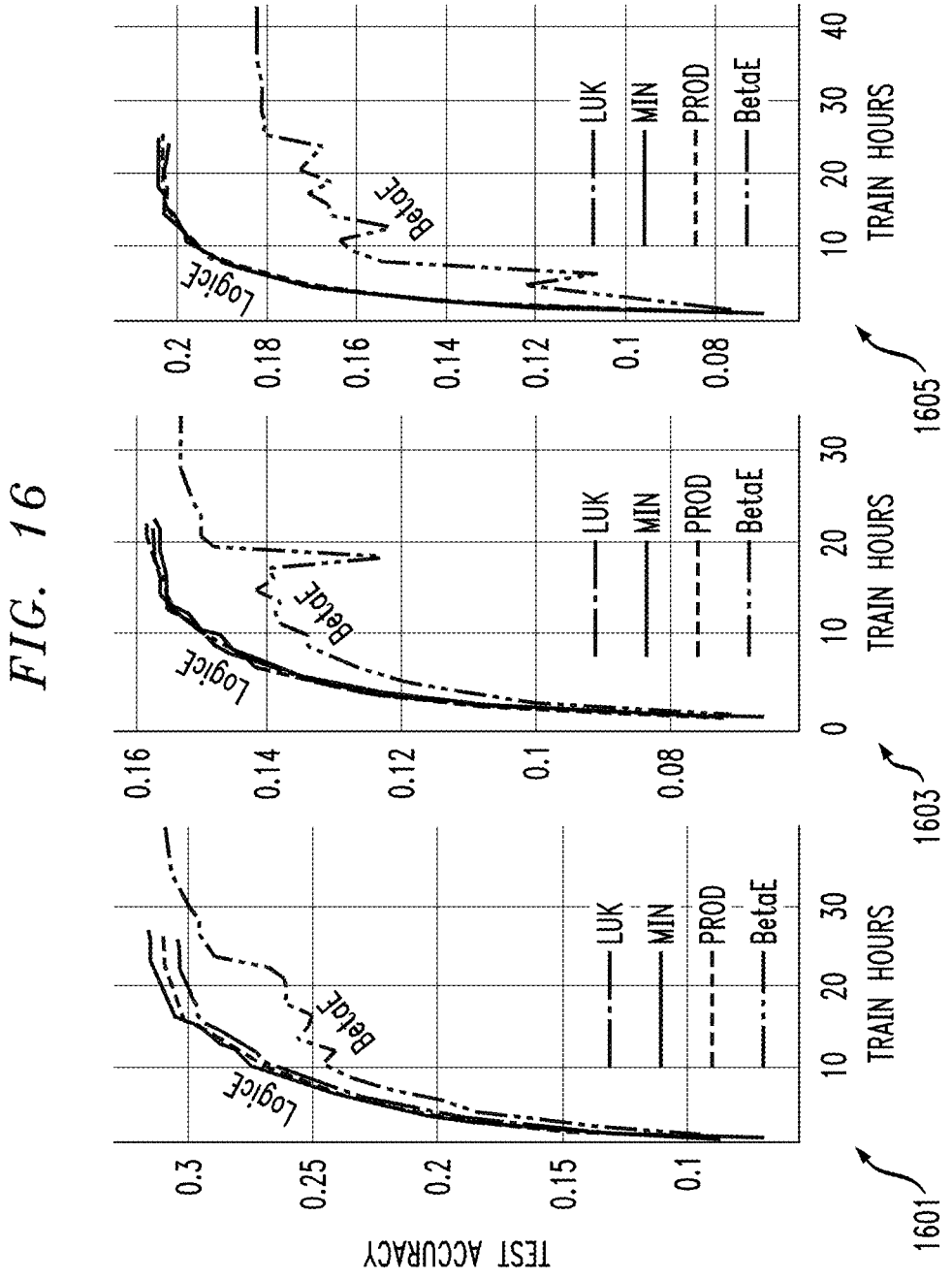
FIG. 16 shows an exemplary test accuracy versus training time comparison, achieved according to an aspect of the invention.

Training speed: *BETAE* uses the Beta distribution with no closed form that requires integration to compute entropy and dissimilarity. In contrast, LOGICE uses simple truth bounds with fast entropy and dissimilarity calculations. FIG. 16 (Test accuracy vs. training time comparison (V100)) shows that LOGICE with any t-norm trains 2-3× faster than BETAE, with the exact same compute resources, optimizer and learning rate. The LOGICE training curve also appears smooth and monotonic, compared to disrupted learning progress with BETAE. View 1601 is for Dataset 1, view 1603 is for Dataset 2, and view 1605 is for Dataset 3.

Logic embeddings in accordance with one or more embodiments can advantageously perform logical negation, and are empirically relatively accurate in link prediction and answer size estimation and are relatively compute inexpensive. One or more embodiments can, advantageously, perform logic negations and are able to model answer size. Indeed, one or more embodiments of logic embeddings perform a type of lifted inference.

Thus, embedding complex logic queries close to answers is efficient, but presents several difficulties in set theoretic modeling of uncertainty and full existential FOL, where Euclidean geometry and probability density approaches suffer deficiency and computational expense. Logic embeddings in accordance with one or more embodiments overcome these difficulties by converting set logic into direct real-valued logic. One or more embodiments execute FOL queries logically, and not through Venn diagram models like other embeddings, yet achieve efficiency of lifted inference over subsets.

We have found that one or more embodiments may need more training data than search-based methods, although, advantageously, strong inductive bias of t-norm logic reduces sample size dependence.

One or more embodiments provide: a system for answering existential first-order (FOL) queries over incomplete knowledge bases (KBs), including: an array of truth bounds (logic embedding) per KB entity, a function (Skolem function) per KB relation that substitutes a logic embedding for another logic embedding, a function that estimates query answer size from a logic embedding, a function that finds an answer set given a logic embedding; a method for encoding an FOL query into a logic embedding; and/or a method for machine learning logic embeddings for optimized answering.

One or more instances provide a method for encoding an FOL query into a logic embedding includes logic operations of conjunction, disjunction and negation over logic embeddings, a Skolem function per KB relation that substitutes a logic embedding for another logic embedding; a method for converting an FOL query into logic embeddings (Skolem set logic) for query anchor entities, logic operators, and Skolem functions.

One or more instances provide a method for machine learning logic embeddings for optimized answering, including: initialization of logic embeddings to ensure lower bounds are less than upper bounds, converting training FOL queries into Skolem set logic; a method for measuring the dissimilarity of two logic embeddings; a contrastive loss function (system loss) with objective of ground truth (positive) answer entities with less loss than (negative) non-answer entities; updating entity logic embeddings, relation embeddings, and Skolem functions to minimize the system loss.

In one or more embodiments, a method for logic conjunction of logic embeddings, employs an attention matrix that weights each truth bound element of each conjunction input logic embedding separately to produce a weighted conjunction.

In one or more embodiments, learning attention of logic conjunction employs a parameterized attention function that converts a logic embedding into normalized weights, updating the attention function parameters to minimize the system loss.

One or more embodiments query answer size from a logic embedding, employing entropy calculations per truth bound in a logic embedding, a function of entropies in a logic embedding that predicts the answer size for the query represented by the input logic embedding.

In some cases, converting FOL queries into Skolemized form involves replacing existential variables with Skolem terms.

In some cases, a weighted logic conjunction for logic embeddings involves equivalence to unweighted logic when weights are one, and removing inputs when weights are zero.

Some embodiments represent logic queries as logical networks that can incorporate other logical networks, where the combined logical network can perform inference that involves the logic query and, e.g., support axioms and facts.

One or more embodiments provide techniques for translating natural language question as logic to encode them using logic embeddings for knowledge base question answering over incomplete knowledge bases; including a translation mechanism using semantic parse to a well-formed existential first order logic that is then encoded using logic embeddings to answer the question over incomplete knowledge bases.

One or more embodiments provide techniques that employ Skolem set logic over logic embeddings for fast querying, with logical operations that correspond to set operations over the underlying entity subsets.

Optionally, an explainability module is provided and is coupled to the logic embedding volume to provide user understanding during and after embedding training. The same can provide, for example, an explainability graph that connects singleton anchor and subset logic embeddings as edges, with vertices labeled as relations between embeddings. Latent propositions map to logic embeddings graph traversal and graph traversal provides subset relations. Multi-hop graph traversals between logical embeddings provide a chain of relations and full explanation of query relations.

Some embodiments employ a multi-layer perceptron (MLP): instead of using an MLP, a multi-head attention layer could be employed for learning relation embeddings.

Given the discussion thus far, it will be appreciated that, in general terms, an exemplary method for improving the technological process of computerized answering of logical queries over incomplete knowledge bases, according to an aspect of the invention, includes obtaining a first order logic query; with a trained, computerized neural network, converting the first order logic query into a logic embedding; and answering the first order logic query using the logic embedding.

Said logic embedding employs, for example, lower and upper truth bounds at least equal to zero and no greater than one. For example, the logic embedding includes a tuple of pairs of the lower and upper truth bounds.

One or more embodiments further include measuring dissimilarity between logic embeddings of subsets with a dissimilarity measure employing an expected mean of $L_1$-norms of the truth bounds. One or more embodiments still further include training the computerized neural network to embed a given query close to at least one answer of the given query, and far from negative samples, by minimizing a query answering loss.

The query answering loss is given by expression (8), for example, wherein: $\sigma$ comprises a sigmoid function; $\gamma$ comprises a hyperparameter scaled to be less than the average dissimilarity between entity embeddings; D comprises the dissimilarity measure; y comprises the answers of the given query; q comprises the given query; k comprises a number of the negative samples; and $z_j$ comprises a $j^{th}$ one of the negative sample embeddings.

In one or more embodiments, the dissimilarity measure is given by equation (2), wherein: $S_x$, $S_{x'}$ comprise logic embeddings of subsets (X,X'), n comprises a number of elements in $S_x$, i comprises a counting index, 1 and l' comprise the lower truth bounds; and u and u' comprise the upper truth bounds.

In another aspect, another exemplary method is provided, for improving the technological process of training a computerized neural network to convert first order logic queries into logic embeddings for answering of the logical queries over incomplete knowledge bases. This method includes training the computerized neural network to embed a given query close to at least one answer of the given query, and far from negative samples, by minimizing a query answering loss, wherein the query answering loss is given by expression (8), for example, with parameters as discussed above. Here as well, in one or more embodiments, the dissimilarity measure is given by equation (2), for example, with parameters as discussed above.

In another aspect, an exemplary system includes a memory (e.g. 30, discussed elsewhere); optionally, a non-transitory computer readable medium (e.g. 34, discussed elsewhere) including computer executable instructions; and at least one processor 16, coupled to the memory and the non-transitory computer readable medium, and operative to execute the instructions to be operative to perform any one, some, or all of the method steps described above. The instructions on the medium can also configure the processor to instantiate appropriate software components as will be apparent from the descriptions herein.

Figure 17:
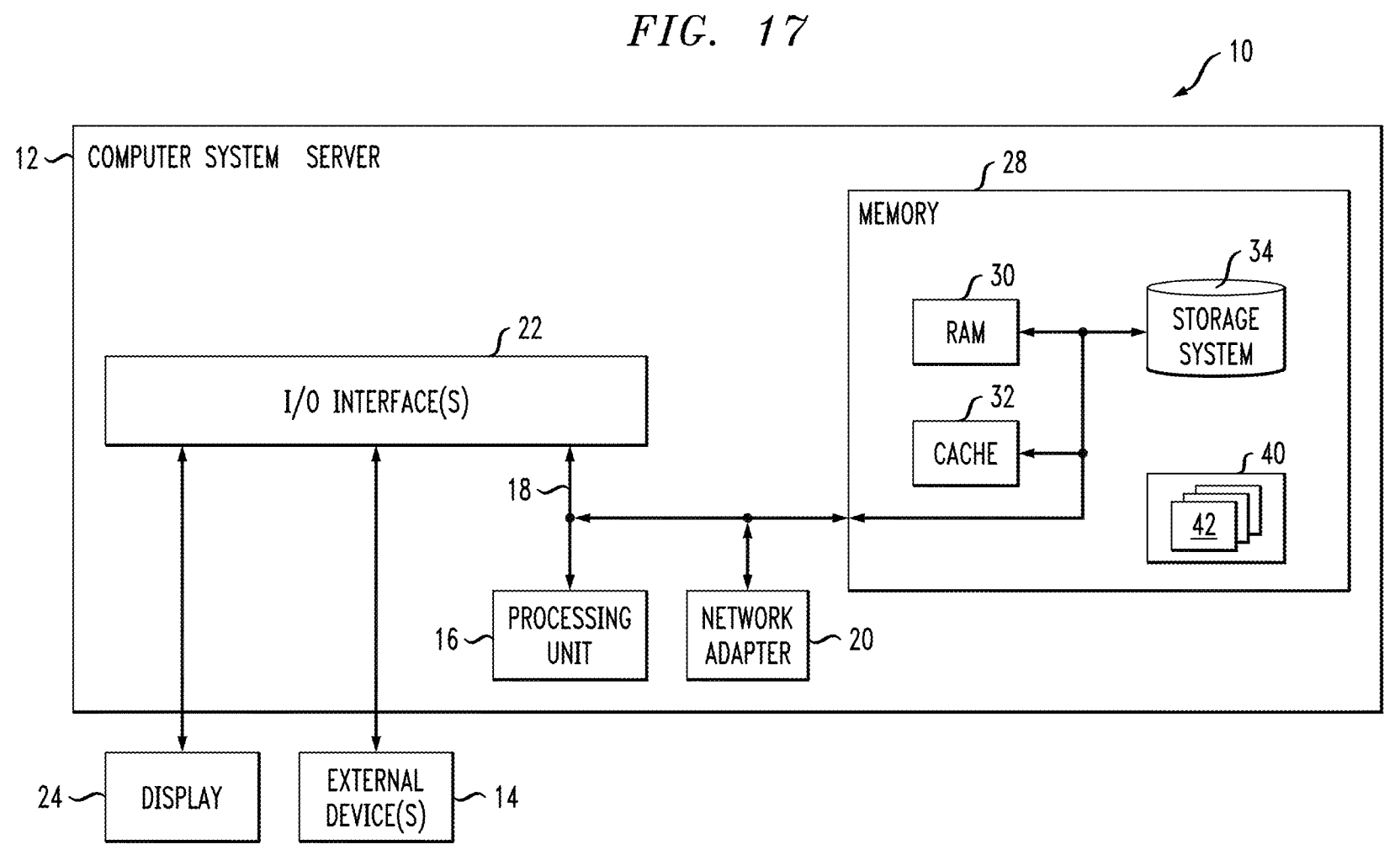

One or more embodiments of the invention, or elements thereof, can accordingly be implemented in the form of an apparatus/system including a memory and at least one processor that is coupled to the memory and operative to perform exemplary method steps. FIG. 17 depicts a computer system that may be useful in implementing one or more aspects and/or elements of the invention, also representative of a cloud computing node according to an embodiment of the present invention. Referring now to FIG. 17, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 17, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 17) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 (or one or more elements thereof) to provide logic embeddings for complex query answering/training for same, and the like, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein. The method steps can then be carried out using the distinct software modules and/or sub-modules of the system, as described above, executing on one or more hardware processors such as 16.

Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow-chart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving the technological process of computerized answering of logical queries over incomplete knowledge bases, comprising:

obtaining, by a server computing system comprising at least one processor and a memory, a plurality of latent propositions and a first order logic query including a plurality of target variables and a plurality of entities including at least one anchor element;

converting, by said server computing system using a trained, computerized neural network, said first order logic query into a logic embedding using Skolem set logic representations for said target variables, given said at least one anchor element, wherein said logic embedding characterizes a plurality of subset entities of said plurality of entities of said first order logic query using said plurality of latent propositions; and answering said first order logic query using said logic embedding by performing real-valued logic on first latent propositions of said plurality of latent propositions that describe said plurality of subset entities and filter entities of said incomplete knowledge bases to identify an answer set from of said incomplete knowledge bases.

2. The method of claim 1, wherein, in said converting step, said logic embedding employs lower and upper truth bounds on said plurality of latent propositions that describe said plurality of subset entities,

wherein said lower and upper truth bounds are at least equal to zero and no greater than one, and wherein said lower and upper truth bounds correlate with uncertainty, and wherein said filtering of entities of said incomplete knowledge bases to identify said answer set uses said lower and upper truth bounds to control a size of said answer set.

3. The method of claim 2, wherein, in said converting step, said logic embedding comprises a tuple of pairs of said lower and upper truth bounds.

4. The method of claim 2, further comprising measuring dissimilarity between logic embeddings of said plurality of subset entities with a dissimilarity measure employing an expected mean of L1-norms of said truth bounds.

5. The method of claim 4, further comprising training weights of said computerized neural network to embed a given query within a knowledge base close to answers of said given query, and far from negative samples, by minimizing a query answering loss, wherein said weights are applied to said lower and upper truth bounds on said plurality of latent propositions that describe said plurality of subset entities.

6. The method of claim 5, wherein said query answering loss is given by:

$$-\log\sigma(\gamma - D(y, q)) - \sum_{j=1}^{k} \frac{1}{k}\log\sigma(D(z_j, q) - \gamma)$$

wherein:

σ comprises a sigmoid;

γ comprises a hyperparameter scaled to be less than the average dissimilarity between entity logic embeddings characterizing subset entities of said given query;

D comprises said dissimilarity measure between said entity logic embeddings characterizing said subset entities of said given query;

y comprises a candidate answer set of said given query;

q comprises said given query;

k comprises a number of said plurality of negative samples; and $z_j$ comprises a $j^{th}$ one of said negative samples.

7. The method of claim 6, wherein said dissimilarity measure comprises:

$$D(S_X, S_{X'}) = \sum_{i=1}^{n} \frac{\|l_i - l_i'\| + \|u_i - u_i'\|}{2n}$$

wherein:

$S_X$, $S_x$ comprise said entity logic embeddings of subsets (X,X'), n comprises a number of elements in $S_x$, i comprises a counting index, l and l' comprise said lower truth bounds of said subsets (X,X') respectively, on latent propositions that describe said given query; and u and u' comprise said upper truth bounds of said subsets (X,X') respectively, on said latent propositions that describe said given query.

8. The method of claim 7, further comprising providing an explainability graph subsequent to said training.

9. A method for improving the technological process of training a computerized neural network to convert first order logic queries into logic embeddings for answering of said first order logical queries over incomplete knowledge bases, comprising training weights of said computerized neural network to embed a given query close to a candidate answer set of said given query, and far from a plurality of negative samples, by minimizing a query answering loss, wherein said query answering loss is given by:

$$-\log\sigma(\gamma - D(y, q)) - \sum_{j=1}^{k}\frac{1}{k}\log\sigma(D(z_j, q) - \gamma)$$

wherein:

$\sigma$ comprises a sigmoid;

$\gamma$ comprises a hyperparameter scaled to be less than an average dissimilarity between entity logic embeddings characterizing a plurality of subset entities of said given query using a plurality of latent propositions;

D comprises said dissimilarity measure between said entity logic embeddings;

y comprises said candidate answer set of said given query;

q comprises said given query;

k comprises a number of said plurality of negative samples; and $z_j$ comprises a $j^{th}$ one of said negative samples.

10. The method of claim 9, wherein said dissimilarity measure comprises:

$$D(S_X, S_{X'}) = \sum_{i=1}^{n}\frac{\|l_i - l_i'\| + \|u_i - u_i'\|}{2n}$$

wherein:

$S_x$, $S_x'$ comprise said entity logic embeddings of subsets (X,X'), n comprises a number of elements in $S_x$, i comprises a counting index, l and l' comprise lower truth bounds of said subsets (X,X') respectively, on first latent propositions of said plurality of latent propositions that describe said given query; and u and u' comprise upper truth bounds of said subsets (X,X') respectively, on said first latent propositions of said plurality of latent propositions that describe said given query.

11. An apparatus for improving the technological process of computerized answering of logical queries over incomplete knowledge bases, comprising:

a memory; and at least one processor, coupled to said memory, and operative to:

obtain a plurality of latent propositions and a first order logic query including a plurality of target variables and a plurality of entities including at least one anchor element;

with a trained neural network, convert said first order logic query into a logic embedding using Skolem set logic representations for said target variables, given said at least one anchor element, wherein said logic embedding characterizes a plurality of subset entities of said plurality of entities of said first order logic query using said plurality of latent propositions; and answer said first order logic query using said logic embedding by performing real-valued logic on first latent propositions of said plurality of latent propositions that describe said plurality of subset entities and filter entities of said incomplete knowledge bases to identify an answer set from of said incomplete knowledge bases.

12. The apparatus of claim 11, wherein said logic embedding employs lower and upper truth bounds on said plurality of latent propositions that describe said plurality of subset entities, wherein said lower and upper truth bounds are at least equal to zero and no greater than one, and wherein said lower and upper truth bounds correlate with uncertainty, and wherein said filtering of entities of said incomplete knowledge bases to identify said answer set uses said lower and upper truth bounds to control a size of said answer set.

13. The apparatus of claim 12, wherein said logic embedding comprises a tuple of pairs of said lower and upper truth bounds.

14. The apparatus of claim 12, wherein said at least one processor is further operative to measure dissimilarity between logic embeddings of said plurality of subset entities with a dissimilarity measure employing an expected mean of L1-norms of said truth bounds.

15. The apparatus of claim 14, wherein said at least one processor is further operative to train weights of said computerized neural network to embed a given query within a knowledge base close to answers of said given query, and far from negative samples, by minimizing a query answering loss, wherein said weights are applied to said lower and upper truth bounds on said plurality of latent propositions that describe said plurality of subset entities.

16. The apparatus of claim 15, wherein said query answering loss is given by:

$$-\log\sigma(\gamma - D(y, q)) - \sum_{j=1}^{k}\frac{1}{k}\log\sigma(D(z_j, q) - \gamma)$$

wherein:

$\sigma$ comprises a sigmoid;

$\gamma$ comprises a hyperparameter scaled to be less than the average dissimilarity between entity logic embeddings characterizing subset entities of said given query;

D comprises said dissimilarity measure between said entity logic embeddings characterizing said subset entities of said given query;

y comprises a candidate answer set of said given query;

q comprises said given query;

k comprises a number of said plurality of negative samples; and $z_j$ comprises a $j^{th}$ one of said negative samples.

17. The apparatus of claim 16, wherein said dissimilarity measure comprises:

$$D(S_X, S_{X'}) = \sum_{i=1}^{n}\frac{\|l_i - l_i'\| + \|u_i - u_i'\|}{2n}$$

wherein:

$S_x$, $S_x'$ comprise said entity logic embeddings of subsets (X,X'), n comprises a number of elements in $S_x$, i comprises a counting index, l and l' comprise said lower truth bounds of said subsets (X,X') respectively, on latent propositions that describe said given query; and u and u' comprise said upper truth bounds of said subsets (X,X') respectively, on said latent propositions that describe said given query.

18. A computer program product for improving the technological process of computerized answering of logical queries over incomplete knowledge bases, the computer program product comprising a computer readable storage medium having program instructions embodied therewith, the program instructions executable by a processor to cause the processor to:

obtain a plurality of latent propositions and a first order logic query including a plurality of target variables and a plurality of entities including at least one anchor element;

with a trained, computerized neural network, convert said first order logic query into a logic embedding using Skolem set logic representations for said target variables, given said at least one anchor element, wherein said logic embedding characterizes a plurality of subset entities of said plurality of entities of said first order logic query using said plurality of latent propositions; and answer said first order logic query using said logic embedding that performs real-valued logic on first latent propositions of said plurality of latent propositions that describe said plurality of subset entities and filter entities of said incomplete knowledge bases to identify an answer set from of said incomplete knowledge bases.

19. The computer program product of claim 18, wherein said logic embedding employs lower and upper truth bounds on said plurality of latent propositions that describe said plurality of subset entities, wherein said lower and upper truth bounds are at least equal to zero and no greater than one, and wherein said lower and upper truth bounds correlate with uncertainty, and wherein said filtering of entities of said incomplete knowledge bases to identify said answer set uses said lower and upper truth bounds to control a size of said answer set.

20. The computer program product of claim 19, wherein said logic embedding comprises a tuple of pairs of said lower and upper truth bounds.

21. The computer program product of claim 19, wherein the program instructions are further executable by said processor to cause said processor to measure dissimilarity between logic embeddings of said plurality of subset entities with a dissimilarity measure employing an expected mean of L1-norms of said truth bounds.

22. The computer program product of claim 21, wherein the program instructions are further executable by said processor to cause said processor to train weights of said computerized neural network to embed a given query close to at least one answer of said given query, and far from negative samples, by minimizing a query answering loss, wherein said weights are applied to said lower and upper truth bounds on said plurality of latent propositions that describe said plurality of subset entities.

23. The computer program product of claim 22, wherein said query answering loss is given by:

$$-\log\sigma(\gamma - D(y, q)) - \sum_{j=1}^{k} \frac{1}{k} \log\sigma(D(z_j, q) - \gamma)$$

wherein:

$\sigma$ comprises a sigmoid;

$\gamma$ comprises a hyperparameter scaled to be less than the average dissimilarity between entity logic embeddings characterizing subset entities of said given query;

D comprises said dissimilarity measure between said entity logic embeddings characterizing said subset entities of said given query;

y comprises a candidate answer set of said given query;

q comprises said given query;

k comprises a number of said plurality of negative samples; and $z_j$ comprises a $j^{th}$ one of said negative samples.

24. The computer program product of claim 23, wherein said dissimilarity measure comprises:

$$D(S_X, S_{X'}) = \sum_{i=1}^{n} \frac{\|l_i - l_i'\| + \|u_i - u_i'\|}{2n}$$

wherein:

$S_x$, $S_x$ comprise said entity logic embeddings of subsets (X,X'), n comprises a number of elements in $S_x$, i comprises a counting index, l and l' comprise said lower truth bounds of said subsets (X,X') respectively, on latent propositions that describe said given query; and u and u' comprise said upper truth bounds of said subsets (X,X') respectively, on said latent propositions that describe said given query.

25. A computer program product for improving the technological process of training a computerized neural network to convert first order logic queries into logic embeddings for answering of said first order logical queries over incomplete knowledge bases, the computer program product comprising a computer readable storage medium having program instructions embodied therewith, the program instructions executable by a processor to cause the processor to train weights of said computerized neural network to embed a given query close to a candidate answer set of said given query, and far from a plurality of negative samples, by minimizing a query answering loss, wherein said query answering loss is given by:

$$-\log\sigma(\gamma - D(y, q)) - \sum_{j=1}^{k} \frac{1}{k} \log\sigma(D(z_j, q) - \gamma)$$

wherein:

$\sigma$ comprises a sigmoid;

$\gamma$ comprises a hyperparameter scaled to be less than an average dissimilarity between entity logic embeddings characterizing subset entities of said given query;

D comprises said dissimilarity measure between said entity logic embeddings characterizing said subset entities of said given query;

y comprises said candidate answer set of said given query;

q comprises said given query;

k comprises a number of said plurality of negative samples; and $z_j$ comprises a $j^{th}$ one of said negative samples.

26. The computer program product of claim 25, wherein said dissimilarity measure comprises:

$$D(S_X, S_{X'}) = \sum_{i=1}^{n} \frac{\|l_i - l_i'\| + \|u_i - u_i'\|}{2n}$$

wherein:

$S_x$, $S_x$ comprise said entity logic embeddings of subsets (X,X'), n comprises a number of elements in $S_x$, i comprises a counting index, l and l' comprise lower truth bounds of said subsets (X,X') respectively, on latent propositions that describe said given query; and u and u' comprise upper truth bounds of said subsets (X,X') respectively, on latent propositions that describe said given query.

\* \* \* \* \*